United States Patent [19]

Martino et al.

[11] Patent Number: 4,474,353

[45] Date of Patent: Oct. 2, 1984

[54] MOUNTING ASSEMBLY FOR MOBILE COMMUNICATIONS ANTENNA AND METHOD

[75] Inventors: Louis J. Martino, Oak Brook; Frank M. Samela, Lombard; Robert J. Steinhofer, Franklin Park, all of Ill.

[73] Assignee: Orion Industries, Inc.

[21] Appl. No.: 259,047

[22] Filed: Apr. 30, 1981

[51] Int. Cl.[3] .............................................. A01K 97/10

[52] U.S. Cl. ...................................... 248/534; 248/467

[58] Field of Search ..................... 248/467, 534, 205.3, 248/205.4, 537; 343/715

[56] References Cited

U.S. PATENT DOCUMENTS 3,532,316 10/1970 Mathes ............................ 248/205.3

3,542,321 11/1970 Kahabka ...................... 248/205.3 X 3,800,449 4/1974 Minatodani ................. 248/205.3 X 4,266,227 5/1981 Blaese ................................ 343/715

4,293,860 10/1981 Iwata ................................. 343/715

*Primary Examiner*—J. Franklin Foss

*Attorney, Agent, or Firm*—Dressler, Goldsmith, Shore, Sutker & Milnamow, Ltd.

[57] ABSTRACT

An improved method for securing an antenna to a vehicular window. Adhesive securance of a base portion of an antenna assembly is accomplished by an adhesive means including a conformable foam layer and a pressure sensitive adhesive layer. A bridge of silicone adhesive is provided to surround the adhesive means, and a shield is disposed thereabout and is adhered to the window and base to protect the adhesive means and to restrain removal of the base portion from the window.

10 Claims, 5 Drawing Figures

MOUNTING ASSEMBLY FOR MOBILE COMMUNICATIONS ANTENNA AND METHOD

DESCRIPTION

Technical Field

The present invention relates to a mounting assembly for a mobile communications antenna. The assembly and method of the present invention overcome problems of securance of such mounting assemblies to windshields and rear windows, both as to ease of mounting and occassional incidents of window damage due to use of adhesives such as epoxy cements.

Background Art

The prior art does provide a highly desirable antenna mounting assembly for securing an antenna to a vehicle window and which allows for expeditious removal of the antenna from the window. One such glass mounted assembly is shown in U.S. patent application Ser. No. 67,804 filed on Aug. 20, 1979 now U.S. Pat. No. 4,266,227, issued on May 5, 1981. However, problems have arisen with such assemblies when they are secured with epoxy cements to windshields and rear windows. It appears that because of differences in coefficients of expansion of epoxy cements and glass, or for other reasons, occasional shattering of the glass has occured when such assemblies are secured with epoxies to the glass. The use of other adhesives, such as silicones, has also generated problems of securance, for example because the time silicones usually take to set up adequately to withstand the stresses due to wind loads on an associated antenna is undesirably long.

Disclosure of the Invention

The antenna mounting assembly of the present invention provides the advantages disclosed for antenna mounts such as those described in U.S. Pat. No. 4,266,227, and provides the further advantage of improved and rapid adherance to windshields and the like without the disadvantages attendant the use of epoxy cements.

An assembly of this invention for mounting an antenna to a window of a vehicle comprises a base having a lower surface, means for securing an antenna and a marginal edge. An adhesive layer intermediate the lower surface and the window instantly adheres the base to the window. A shield defining an expansive lower surface portion is adhesively bonded to the window and the base and surrounds the marginal edge to protect the adhesive layer. The shield further comprises means overlying the base for restraining removal of the base from the window. Preferably the adhesive layer comprises a foam layer adhered to the base and a pressure sensitive adhesive layer securing the foam layer and the base to the window. Desirably the shield defines an aperture of substantially the same size and configuration as the marginal edge. The aperture surrounds and embraces the marginal edge. Adhesive between the marginal edge and the aperture acts as a seal to inhibit the passage of water to the foam layer which would weaken the bonding properties. The expansive lower surface of the shield is preferably spaced from the window by a distance defined by the means on the shield which overlie the base.

The method of the present invention involves the securance of an antenna to a vehicular window, and comprises the steps of providing a base having a lower surface adapted to confront and to be secured to a window, a marginal edge and means for securing an antenna member thereon, adhesively adhering the lower surface of the base to the window with an adhesive means and providing a shield for the base. The shield is adapted to surround the marginal edge and the shield defines an expansive surface adapted to be adhesively secured to the window. The shield further comprises means adapted to overlie the base to orient the cover with respect to the base. The method further comprises adhesively securing the shield to the window in a position to surround the marginal edge of the base thereby to protect the adhesive means on the base from water, and whereby the orienting means restrains removal of the base from the window. Preferably the adhesive means comprises a foam layer adhered to the base and a pressure sensitive adhesive layer to adhere the base to the window, and the method comprises the further step of providing an adhesive bridge between the periphery of the adhesive means and the window prior to adhesively securing the shield, and wherein the shield defines an aperture closely surrounding the marginal edge, so that when the shield is adhesively secured to the window, the bridge is spread and displaced to provide an adhesive bond between the base, the window and the shield. Desirably the shield is provided with a layer of adhesive on its expansive surface and is pressed into position to surround the marginal edge of the base until the expansive surface is spaced slightly from the window with the overlying means in engagement with the base.

BRIEF DESCRIPTION OF DRAWINGS

Further objects, features and advantages of this invention will become apparent from the drawings which illustrate a presently preferred embodiment of the invention.

THE PRESENTLY PREFERRED EMBODIMENT

Figure 1:
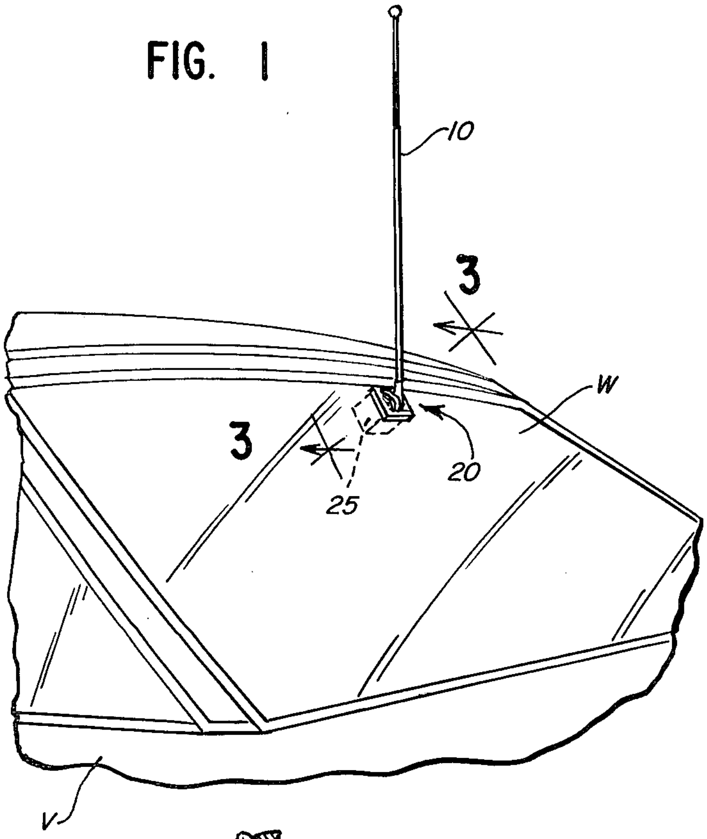
FIG. 1 is a perspective view of an antenna mounting apparatus of this invention typically attached to a glass window of a vehicle.

While this invention is susceptible of embodiment in many different forms, there is shown in the drawings and will herein be described in detail a presently preferred embodiment, with the understanding that the present disclosure is to be considered as an exemplification of the principles of the invention and is not intended to limit the invention to the embodiment illustrated.

The drawings illustrate an antenna assembly adapted for mounting to a vehicle and, in the embodiment illustrated, to the windshield or rear window of a vehicle. The antenna assembly is specially designed for securing an elongated radiating antenna member or whip 10 against dislodgement or rearward or forward movement due to vibration induced by the vehicle and air movement, thereby stabilizing and maintaining the predetermined position of the antenna whip 10 during vehicle movement, while also providing for easy removal of the antenna whip 10 when desired.

The antenna assembly comprises a mounting assembly 20 attaching the antenna assembly to a window W of the vehicle V. Mounting assembly 20 comprises a plate like base 22 having a lower surface which serves as a mounting face 23. Face 23 is secured to window W by a suitable adhesive system which preferably permits the removal of the base 22 when removal is desired.

Figure 2:
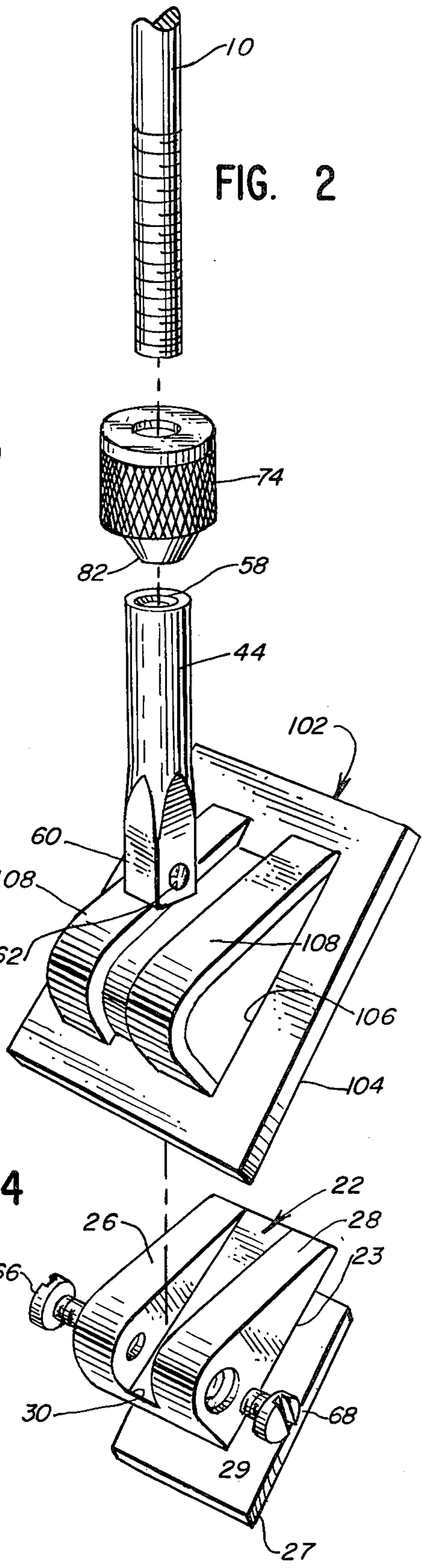
FIG. 2 is an exploded perspective view of the antenna mounting apparatus of FIG. 1.
Figure 5:
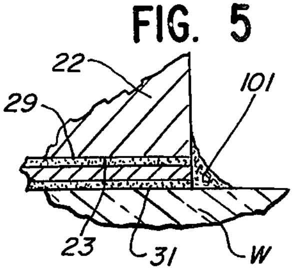
FIG. 5 is a view of a trowel used in connection with the practice of the method of this invention.
Figure 3:
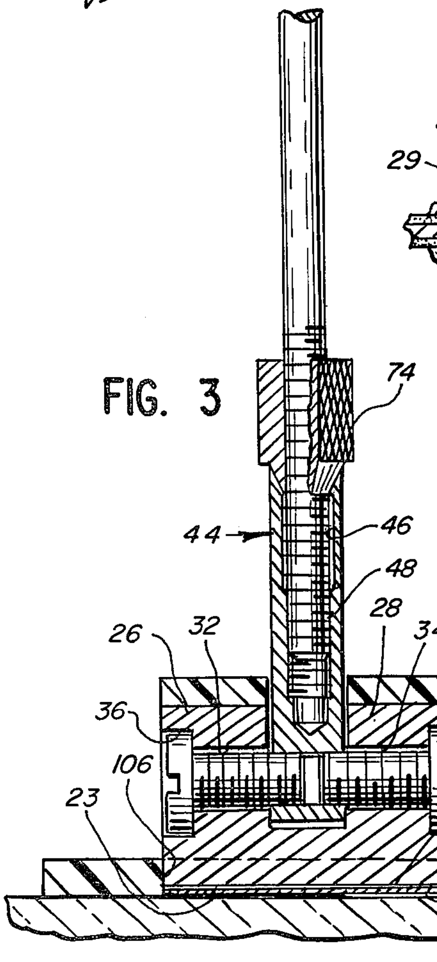
FIG. 3 is a sectional view taken substantially along a plane indicated by section line 3—3 in FIG. 1.

Base 22 further comprises two generally parallel wall members 26 and 28 which are integral with and extend upwardly from base 22. Together they define a groove 30 therebetween. Walls 26 and 28 define right cylindrical bores 32 and 34, and as seen in FIGS. 2 and 3, bores 32 and 34 align with each other directly across the groove 30. Bores 32 and 34 terminate in larger diameter countersunk seats 36 and 38 respectively.

Preferably base 22 is a weather resistant, chrome-plated casting. Base 22 also functions as one of the capacitor members of a coupling capacitor of the type disclosed in U.S. Pat. No. 4,238,799, thereby to transmit through the glass as disclosed in said patent. Base 22 is preferably coupled with an interior capacitor plate and tuning assembly 25, such as is described in said patent.

As stated, the antenna assembly is preferably adhesively secured to the window W which is thoroughly cleaned in the zone of attachment prior to securance of the mounting assembly 20.

Base 22 is desirably provided with a self-adhering pressure sensitive tape. Desirably the tape comprises a closed cell crosslinked polyethylene foam substrate 27 which may be approximately 1/32" thick having a self-adhesive layer 29 bonding the foam to the mounting face 23 of the base, and a further self-adhesive layer 31 protectively covered by a removable sheet. After it has been determined precisely where the base 22 will be located and attached to window W and how it will be oriented, the removable sheet is stripped away to expose the adhesive layer 31 and the base is firmly pressed against the window W. Because the adhesive layer includes a foam layer, it is conformable, as to a curved window surface and to surface irregularities. It may also expand and contract both statically and dynamically, thus assisting in providing an improved mounting assembly for the antenna. For purposes of locating, orienting and securing the base to the window, it is desirable to affix it while the antenna whip 10 is attached to the base. That is of advantage especially when a base is relatively small and slight inclinations from a proper angle may be difficult to perceive visually. The whip 10 helps in the proper orientation of the base as it is secured to window W. If the antenna whip 10 has been so attached, it is then removed and set aside.

Figure 4:
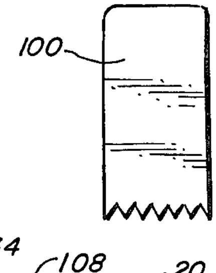
FIG. 4 is a enlarged view of a portion of an antenna mounting assembly of this invention.

Next, a small amount of silicone adhesive, such as Dow Corning Silicone 731, is applied to the base between the marginal edge of the base and edges of the foam 27 and the window W to form a fillet or bridge 101 thereof, as is shown in FIG. 4. Preferably the rounded corner of a plastic trowel 100 or the like is used to shape the bridge 101 so that it is uniform and comprises a proper amount of adhesive.

The mounting system further comprises a protective shield or cover 102. Cover 102 includes a marginal expansive, generally flat surface 104 defining a central aperture 106 substantially the same in size and configuration as the marginal edge of the base 22. It is intended to closely and snugly surround and protect mounting face 23 and to surround and embrace the marginal edge of the base adjacent the mounting face 23.

Protective cover 102 preferably also comprises means, such as straps 108 which overlie the upper surfaces of wall members 26 and 28 thereby to help orient the cover and to maintain the proper positioning of the base 23 and cover 102 while, inter alia, the spread and displaced adhesive bridge 101 sets up. The straps 108 also serve to properly space the cover surface 104 slightly from the window, preferably by a distance of approximately 0.025 inch, as will be explained, and to help restrain removal of the base from the window when the mounting assembly has been installed.

The cover 102 is of a plastic material, such as ABS. To enhance its adhesion to the glass, the surface 104 is preferably coated with a silicone primer. When the cover is to be affixed to the window, silicone adhesive, such as Dow Corning Silicone 731, is applied to the surface 104. Preferably the trowel 100 has a serrated edge which is used to spread the silicone, thereby to distribute it properly on the surface 104.

Cover 102 is then pressed into place with the surface 104 closely adjacent to the window W, with the aperture 106 snugly embracing the marginal portion of the base. The adhesive bridge 101 is squeezed between the edges of the aperture 106, the edge of the foam 27 and the edge of the base 22, thereby to provide a secure, protected adhesive bond between the base 22 and the window W. Because the straps 108 limit movement of cover 102 inwardly toward the window, the surface 104 is slightly spaced from the window W thereby controlling the distribution of the adhesive between surface 104 and the window.

The silicone bridge 101 initially serves to bond the foam to the window glass. When the bridge is spread, as described, it will tend to seal closely around the edges of the foam substrate 27 and adhesive layers 29, 31, thus protecting them from water and exposure to the elements which after a prolonged period might tend to destroy the bonds thereat. It is to be understood that the mechanical movement of the antenna tends to cause the foam to compress and expand, much like a sponge, thereby tending to draw water in which, if the foam was unprotected, would tend to destroy the bond. Further, although some of the silicone on surface 104 may not set as quickly, the bond between the base and the window W permits one to drive a vehicle with the installed system (with a mounted whip 10) substantially immediately, and without fear of dislodging the assembly. When the remaining silicone cures, it serves to provide a firm, integrated mounting assembly in which the foam and the cover anchor and secure the base, hence the antenna whip to the window.

The nature of the silicone adhesive and its flexibility are such that changes in temperature and stresses imposed on the whip and base do not stress the window W. That eliminates the problem of cracking windows which is encountered with epoxy adhesives. The system also makes it possible to use silicone adhesives, unlike prior art systems in which silicone adhesives could not effectively be used for antenna mounts, because it took too long for such adhesives to set-up and because initial ambient conditions sometimes weakened the bond between the silicone and the window.

The remainder of an antenna assembly adapted to be mounted in accordance with the present invention may be of a variety of constructions. One such assembly may be similar to that disclosed in U.S. Pat. No. 4,266,227.

To that end, a whip holding socket 44 of a weather resistant chrome plated casting may be provided for securance to base 22. Socket 44 comprises an upper tubular portion 46. Portion 46 defines a lower threaded bore segment 48. The threads of segment 48 are complementary to threads at the end of whip 10. The uppermost portion of socket 44 defines an annular friction bearing surface 58 which is a beveled surface opening upwardly and outwardly and defining a frusto-conical configuration.

Socket 44 further comprises a lower portion 60 having a generally square horizontal cross-section. The width of lower portion 60 is very slightly less than the width of groove 30. Lower portion 60 defines a threaded socket bore 62 wherein the thread is continuous and unidirectional throughout. Threaded socket bore 62 is aligned to communicate with bores 32 and 34 when lower portion 60 is inserted into groove 30.

A pair of screws 66 and 68 are respectively inserted into bores 32 and 34. Screws 66, 68 have identical threads and threadingly engage in threaded bore 62, at which time socket 44 is adjusted to the orientation desired for antenna whip 10. Screws 66 and 68 are then finally tightened by turning them in opposite directions relative to one another and the heads of the screws are seated in countersunk seats 36 and 38 respectively. When forces are exerted on whip 10 due to vehicular movement, the wind forces or otherwise which tend to alter the disposition of the whip 10, movement of the socket 44 from the pre-set position is resisted because one of screws 66, 68 will resist clockwise torque and the other will resist counter-clockwise torque. In other words, one screw will tend to tighten the connection between socket 44 and base 22 to resist relative movement if the other screw should tend to loosen, unlike constructions wherein both screws will tighten or loosen together. Thus, socket 44, hence whip 10, will be stabilized and maintained in its desired position.

The stability of the antenna assembly of this invention is further enhanced by the means for securing the whip to the socket 44. As seen in FIGS. 2 and 3, antenna whip 10 defines a threaded end which is complementary to the thread of bore segment 48 and to those of a securing means, such as a locking nut 74. Locking nut 74 defines a threaded central opening. The generally cylindrical exterior of locking nut 74 is knurled for aiding in finger-turning and tightening. The bottom portion of locking nut 74 has a confronting friction bearing surface such as a tapered or frusto-conical head 82 having a configuration complementary to annular friction bearing surface 58.

In use, locking nut 74 is screwed onto threaded end of the antenna whip 10 whereby a portion of the threaded end of whip 10 protrudes through locking nut 74. The threaded end is then inserted into socket 44 and is screwed into the threaded portion thereof. Thereafter, locking nut 74 is hand-turned down until frusto-conical head 82 firmly engages friction bearing surface 58 of socket 44. By having the tapered frusto-conical mating frictional surfaces sufficient frictional resistance to auto-disengagement is provided by simple finger-tightening without tools so that whip 48 is prevented from loosening and disengaging from socket 44 because of vehicle and wind vibrations. Locking nut 74 may be easily rotated by hand, and without tools, so as to disengage whip 10 when desired.

From the foregoing detailed description, it will be observed that variations and modifications may be effected without departing from the true spirit and scope of the novel concept of the invention. It is to be understood that no limitation with respect to the specific embodiment illustrated herein is intended or should be inferred. It is, of course, intended to cover by the appended claims all such modifications as fall within the scope of the claims.

What is claimed is:

1. A method of securing an antenna to a vehicular window comprising the steps of providing a base having a lower surface adapted to confront and to be secured to a window, a marginal edge and means for securing an antenna member thereto, adhesively securing said lower surface to said window with an adhesive means, providing a shield for said base, said shield being adapted to surround said marginal edge, said shield defining an expansive surface adapted to be adhesively secured to said window, said shield further comprising means adapted to overlie said base to orient said cover with respect to said base, and adhesively securing said shield to said window in a position to surround said marginal edge of said base thereby to protect said adhesive means, and whereby said orienting means restrains removal of said base from said window.

2. The method in accordance with claim 1 wherein said adhesive means comprises a foam layer adhered to said base and a pressure sensitive adhesive layer to adhere said base to said window.

3. The method in accordance with claim 2 comprising the further step of providing an adhesive bridge between the periphery of said adhesive means and said window prior to adhesively securing said shield, and wherein said shield defines an aperture closely surrounding said marginal edge, whereby when said shield is adhesively secured to said window, said bridge is spread and displaced to provide an adhesive bond between said base, said window and said shield.

4. The method in accordance with claim 3 in which said shield is provided with a layer of adhesive on its expansive surface and is pressed into position to surround the marginal edge of said base until said expansive surface is spaced slightly from the window with said overlying means in engagement with said base.

5. The method in accordance with claim 4 wherein said adhesive bridge and said layer of adhesive comprise a silicone adhesive.

6. A window mounted antenna assembly on a window of a vehicle comprising a base having a lower surface, means for securing an antenna and a marginal edge, an adhesive layer intermediate said lower surface and said window adhesively securing said base to said window, a shield defining an expansive surface portion adhesively bonded to said window and said base, said expansive surface surrounding said marginal edge to protect said adhesive layer, said shield further comprising means overlying said base for restraining removal of said base from said window.

7. A window mounted antenna assembly in accordance with claim 6 wherein said adhesive layer comprises a foam layer adhered to said base and conformable to the window and a pressure sensitive adhesive layer securing said foam layer and said base to said window.

8. A window mounted antenna assembly in accordance with claim 7 wherein said shield defines an aperture of substantially the same size and configuration as said marginal edge, and wherein said aperture surrounds and embraces said marginal edge, and adhesive between said marginal edge and said aperture providing an adhesive bond therebetween.

9. A window mounted antenna assembly in accordance with claim 8 wherein said shield expansive surface is spaced from said window by a distance defined by said overlying means.

10. A window mounted antenna assembly in accordance with claim 9 wherein said adhesive between marginal edge and said aperture is a silicone adhesive.

* * * * *